United States Patent [19]

Fujikawa et al.

[11] Patent Number: 5,157,406
[45] Date of Patent: Oct. 20, 1992

[54] RADAR APPARATUS

[75] Inventors: Takumi Fujikawa, Takarazuka; Motoji Kondo, Kobe, both of Japan

[73] Assignee: Furuno Electric Company, Ltd., Hyogo, Japan

[21] Appl. No.: 651,241

[22] PCT Filed: Jun. 5, 1990

[86] PCT No.: PCT/JP90/00734
 § 371 Date: Feb. 5, 1991
 § 102(e) Date: Feb. 5, 1991

[87] PCT Pub. No.: WO90/15341
 PCT Pub. Date: Dec. 13, 1990

[30] Foreign Application Priority Data
 Jun. 6, 1989 [JP] Japan .................... 1-144501

[51] Int. Cl.$^5$ .............................. H03I 13/24
[52] U.S. Cl. ................................ 342/185
[58] Field of Search ....................... 342/185

[56] References Cited
U.S. PATENT DOCUMENTS

| | | | |
|---|---|---|---|
| 4,387,365 | 6/1983 | Berry et al. | 342/185 |
| 4,697,185 | 9/1987 | Thomas et al. | 342/185 |
| 4,745,475 | 5/1988 | Bicknell | 342/185 |

*Primary Examiner*—Mark Hellner

[57] ABSTRACT

The present invention relates to a raster scanning radar display apparatus which is capable of improving the display of echo signals from objects in the vicinity of a ship on the display surface of an indicator. The raster scanning radar display apparatus includes a memory for storing echo signals based on one search signal, a sweep scanning device for drawing a plurality of imaginary sweeps which are parallel with each other in a display memory each time the pointing bearing of the antenna is varied and for generating signals representative of addresses of memory elements in a display memory scanned by the sweeps. The apparatus whites echo signals into the memory elements of the display memory scanned by one sweep and writes predetermined signals into the memory elements of the display memory scanned by other sweeps. The signals in the disply memory are read and displayed on an indicator.

20 Claims, 8 Drawing Sheets

RADAR APPARATUS

TECHNICAL FIELD

The present invention relates to a radar apparatus which radiates search signals successively in different directions and receives echo signals coming from the respective directions by means of a rotating antenna, writes the echo signals coming from a wide range of directions into a display memory to store the signals therein, and reads the signals therefrom to supply them to an indicator so that surrounding conditions around the radar antenna are indicated on the display surface of the indicator. Particularly, the invention relates to a radar apparatus which writes echo signals caught by an antenna into a display memory in accordance with a novel method, thereby improving the conveyance of information relating to conditions around the vicinity of the own ship on the display surface of an indicator.

BACKGROUND ART

Figure 16:
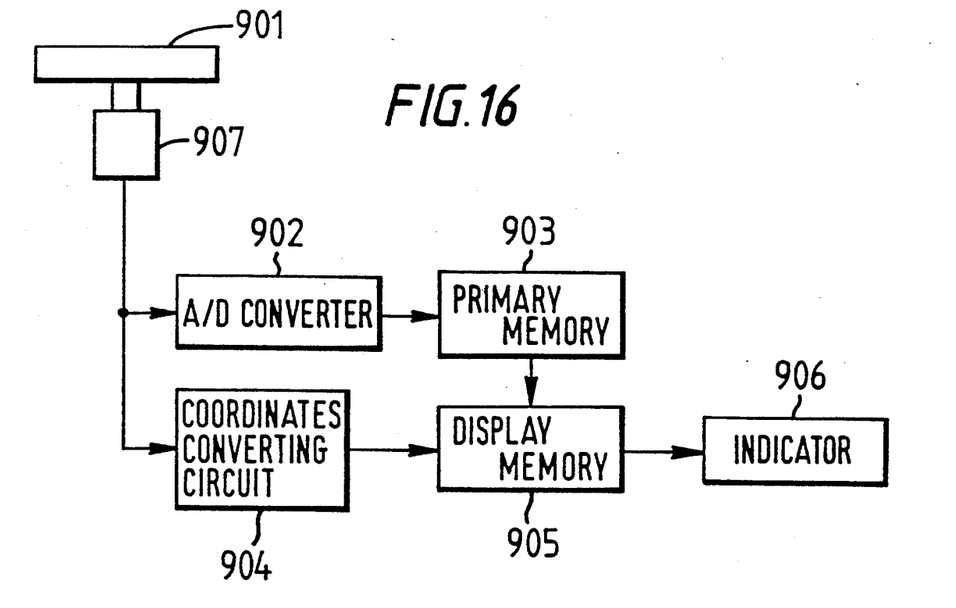
FIG. 16 shows a block diagram of a conventional raster scanning radar apparatus.
Figure 17:
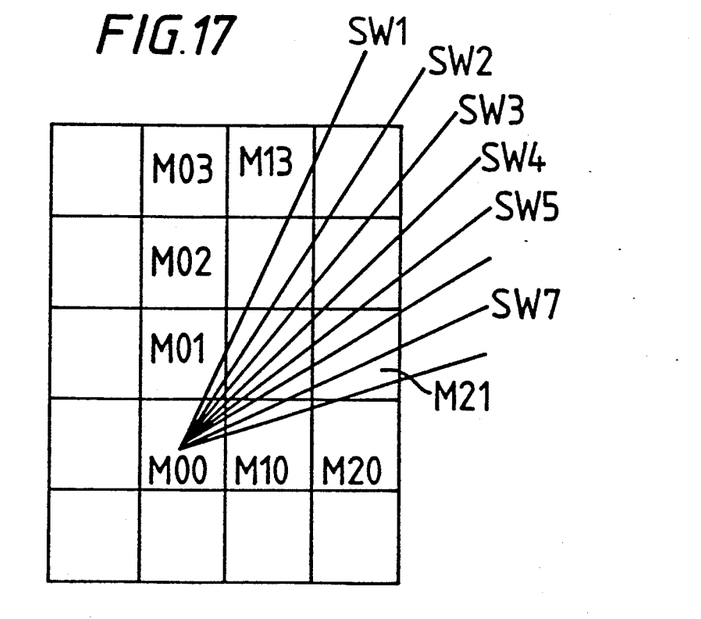
FIG. 17 shows a diagram for explaining the relationship between imaginary sweeps traced in the display memory and memory elements thereof (or picture elements).

A conventional raster scanning radar is constructed as illustrated in FIG. 16. An antenna 901 rotates at a constant speed, radiates radar search signals successively in different directions and receives echo signals. A radar transmitting and receiving unit 907 receives echo signals; an A/D converter 902 converts the echo signals to digital data; and a primary memory 903 stores the resultant converted digital data therein. The primary memory has a memory capacity to store all the echo signals based on one radar search signal corresponding to one radar sweep. A coordinates converter 904 converts the polar coordinates of information in relation to surroundings about the radar antenna to corresponding Cartesian coordinates based on bearing signals produced by the radar transmitting and receiving unit 907 and generates signals representative of the addresses of corresponding memory elements of a display memory. The echo signals read from the primary memory are written into respective memory elements of a display memory 905 which are disposed along an imaginary sweep drawn in correspondence to a direction in which echo signals come, the addresses of the memory elements are identified by output signals of the coordinates converter 904. FIG. 17 shows a relationship between imaginary sweeps traced in the display memory 905 and some memory elements of the display memory when signals read from of the primary memory are written into the memory elements of the display memory 905. Every time the pointing bearing of the antenna 901 varies, relevant contents are refreshed in the display memory 905. Referring to FIG. 17, when a sweep SW1 is traced, echo signals based on one radar search signal and read from the primary memory are successively written into memory elements M00, M01, M11, M12 . . . disposed along the sweep. When a next sweep SW2 is drawn, echo signals supplied by the primary memory are written into memory elements M00, M01, M11, M12, M22 . . . scanned by the sweep. When another sweep SW3 is traced, echo signals are written into memory elements M00, M01, M11, M12, M22 . . . disposed along the sweep. In the same way, when another sweep SW4 is run, echo signals are written into memory elements M00, M10, M11, M21, M22 . . . disposed along the sweep. When another sweep SW5 is drawn, echo signals in response to a following radar search signal and stored in the primary memory and read from the memory are successively written into memory elements M00, M10, M11, M21, M22 disposed along the sweep. When a further sweep SW6 is run, echo signals read from the primary memory are successively written into memory elements M00, M10, M11, M21 . . . disposed along the sweep. In the same way, every time the pointing direction of the radar antenna is varied, an imaginary sweep is drawn in the display memory 905, echo signals read from the primary memory are written into the display memory. An indicating device 906 comprises, for example, a raster-scanned cathode-ray tube, respective picture elements of which correspond to respective memory elements of the display memory 905 and indicates echo signals having come from a wide range of directions, read from the display memory and applied at the input terminal thereof so that surrounding conditions are displayed on the display surface thereof.

With radar apparatuses, an object existing at a far distance is displayed as a relatively big image and the same object existing at a short distance is displayed a small image and thus the same object at a short distance is displayed as narrowly with respect to an angular direction, since a radiation beam or a reception beam formed by a radar antenna has different widths depending on the distance from the antenna or is fan-shaped. Thus, echo signals generated at short distances from the antenna are harder to be recognized on an indicator. This situation also becomes worse when a function for eliminating effects by sea refections is used.

Further, with a raster scanning radar display apparatus, if the number of memory elements are increased in order to improve quality of displayed images, the dimensions of a memory element will become small and thus images are displayed small in the vicinity of the center of the display surface. This has presented difficulties in recognizing echo signals or actually causing failure in recognizing the echo signals.

An antenna having small outer dimensions for forming a radiation beam and a reception beam having a broad horizontal width has been used in order to display as big images echo signals from objects in the vicinity of the own ship on the display surface of a radar indicator. With this arrangement, angular resolution at long distances from the own ship deteriorates on the indicating surface of an indicator and antenna sensitivity will be lowered. Thus, maximum detection range of a radar of this type will be short.

With the conventional radar apparatus in the foregoing, echo signals are written a plurality of times during one rotation of the antenna into respective memory elements of the display memory corresponding to areas in the vicinity of the radar antenna on the display surface of an indicator. Only the last echo signals written into the memory elements are maintained therein and the other signals which had been previously written therein are made invalid. If the last echo signals written lastly into memory elements are zero signals, there is presented such a problem that no echo signals will be stored in the memory elements even if echo signals have been previously written thereinto.

DISCLOSURE OF INVENTION

An object of the present invention is to provide a raster scanning radar display apparatus which is capable of improving the quality of the information conveyed by echo signals particularly, in the vicinity of the own ship being displayed on the display surface of a radar indicator.

Another object of the invention is to provide a radar apparatus which expands received echo signals in an angular direction and displays the resultant signals.

Another object of the invention is to provide a raster scanning radar display apparatus which draws a plurality of imaginary sweeps of a display memory when echo signals based on one radar search signal are written into the display memory, writes the echo signals into respective memory elements disposed along one sweep and writes predetermined signals into respective memory elements disposed along the other sweeps.

Another object of the invention is to provide a raster scanning radar display apparatus which runs two imaginary sweeps of a display memory when echo signals based on one radar search signal are written into the display memory, writes the echo signals into respective memory elements arranged along one sweep and writes predetermined signals into respective memory elements disposed along the other sweep.

Another object of the invention is to provide a raster scanning radar display apparatus which draws three imaginary sweeps of a display memory when echo signals based on one radar search signal are written into the display memory, writes zero signals into memory elements thereof disposed along the first sweep (i.e., the signals stored in the respective memory elements are erased) and writes predetermined signals into respective memory elements arranged along the second and third sweeps.

A further object of the invention is to provide a raster scanning radar display apparatus which runs two imaginary sweeps of a display memory when echo signals based on one radar search signal are written into the display memory, writes zero signals into respective memory elements thereof disposed along the first sweep (i.e., the signals stored in the respective memory elements are eliminated) and writes predetermined signals into respective memory elements disposed along the second sweep.

Still further object of the invention is to provide a raster scanning radar display apparatus which displays a sweep line marker (an independent line marker irrespective of received echo signals) on the display surface of an indicator.

A first feature of the present invention is to provide a raster scanning radar apparatus for radiating radar search signals successively in different directions by a rotating antenna, storing in a display memory echo signals coming from respective directions, reading therefrom and supplying the echo signals to an indicator to display conditions surrounding the antenna on the display surface thereof. The present invention draws a plurality of imaginary sweeps which do not intersect with each other in the display memory when echo signals are written into the display memory, rotates these sweeps about the start points of the sweeps in a direction, writes into the memory elements scanned by one sweep echo signals or signals generated based on the echo signals and writes predetermined signals into the memory elements scanned by the other sweeps.

A second feature of the present invention is to provide a radar apparatus for radiating radar search signals successively in different directions by a rotating antenna, storing in a display memory echo signals coming from respective directions, reading therefrom and supplying the echo signals to an indicator to display conditions surrounding the antenna on the display surface thereof. The present invention comprises a memory for storing echo signals based on one search signal, sweep moving means for drawing a plurality of imaginary sweeps which do not intersect with each other in the display memory and generating signals representative of addresses of the memory elements scanned by these sweeps, writing means for writing echo signals into memory elements of the display memory scanned by one sweep and predetermined signals into the memory elements scanned by the other sweeps, reading means for reading signals from the display memory and an indicator for displaying the signals read from the display memory.

A third feature of the present invention is to provide a raster scanning radar display apparatus comprising a memory for storing echo signals based on one search signal, sweep moving means for drawing a plurality of imaginary sweeps which do not intersect with each other in a display memory each time the pointing direction of the antenna is varied and generating signals representative of the addresses of the memory elements scanned by the sweeps, judgement means for producing distinguishing signals for distinguishing whether a present sweep for scanning memory elements of the display memory is a first one or a second or a further one in the present scan of the radar antenna, writing means for, in response to output signals of the judgement means, writing echo signals supplied from the memory into memory elements of the display memory if one sweep for scanning memory elements of the display memory is a first one and writing into memory elements of the display memory scanned by one sweep signals having the larger values of signals stored in the memory and signals read from the memory elements scanned by the sweep if the sweep for scanning the memory elements of the display memory is a second or a further one, writing means for writing into the memory elements of the display memory scanned by the other sweep or sweeps than the one sweep signals having the larger values of signals stored in the memory and signals read out of the memory elements scanned by the other sweep or sweeps, reading means for reading signals from the display memory and an indicator for displaying the signals read out of the display memory.

A fourth feature of the present invention is to provide a raster scanning radar display apparatus comprising a memory for storing echo signals based on one search signal, a display memory, erasing means for erasing all the signals stored in the display memory, address signal generating means for drawing one imaginary sweep or a plurality of imaginary sweeps which ar in parallel with each other in the display memory each time the pointing bearing of the antenna is varied and generating signals representative of addresses of the memory elements scanned by the sweeps, writing means for writing into the memory elements of the display memory scanned by the one sweep o said plurality of sweeps signals having the larger values of the signals stored in the memory and the signals read from the memory elements scanned by the one sweep or sweeps, reading means for reading signals from the display memory, and an indicator for displaying the signals read out of the display memory.

A fifth feature of the present invention is to provide a raster scanning radar display apparatus comprising a memory for storing echo signals based on one search signal, first and second display memories, address signal generating means for drawing a plurality of imaginary sweeps which are parallel with each other in the first and second display memories respectively each time the pointing bearing of the antenna is varied and generating signals representative of the addresses of the memory elements scanned by the sweeps, zero signal generating means for generating zero signals, bearing signal generating means for generating signals representative of the pointing bearing of the radar antenna, writing means for, in response to output signals of the bearing signal generating means, writing alternately into the memory elements scanned by the plurality of sweeps in the first and second display memories respectively signals having the larger values of the signals stored in the memory and the signals read out of the memory elements scanned by the plurality of sweeps and output signals of the zero signal generating means, reading means for reading signals from the first and second display memories, and an indicator for displaying the signals read from the first and second display memories.

BRIEF DESCRIPTION OF DRAWINGS

Throughout all the drawings, units having the same reference numerals perform the same functions.

EMBODIMENTS

Figure 10:
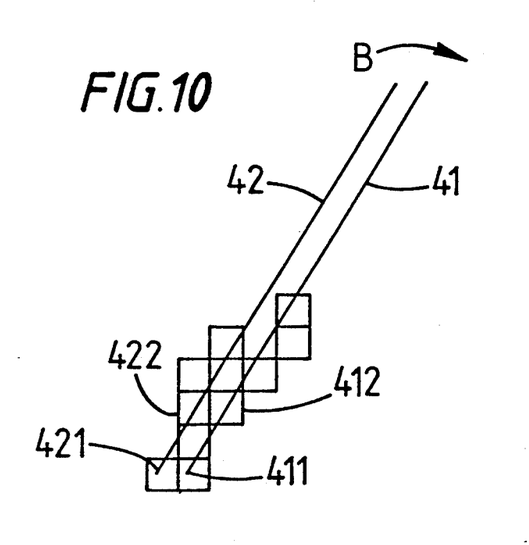
FIG. 10 shows a diagram for explaining the relationship between the first and second sweeps and memory elements of the display memory (or picture elements)

Referring to FIG. 10, there will be explained hereinafter a relationship between two imaginary sweeps in parallel with each other drawn in a display memory used in an embodiment according to the present invention and memory elements into which echo signals are written. "411, 412 ..... 421, 422 ..." represent respective memory elements. "41" and "42" represent imaginary sweeps drawn in a display memory. The sweeps rotate about their start points in a clockwise direction. Thus, the sweeps are drawn successively in different directions from the start points. ,When the second sweep 41 is run, echo signals read from a primary memory are written into memory elements 411, 412 ... scanned by the sweep 41. When the first sweep 42 in parallel with the second sweep is drawn, echo signals read from the primary memory and signals read from the memory elements 421, 422 ... of the display memory are compared with one another, and signals having the larger values of the signals from the primary memory and the signals from the display memory are written into the memory elements 421, 422 ... of the display memory scanned by the sweep 42. In this case, even if echo signals indicated in the vicinity of the own ship on the display surface of an indicator are written into corresponding memory elements of the display memory a plurality of times during one rotation of the antenna, echo signals once written into memory elements are not eradicated during the one rotation of the antenna.

It is also possible to write zero signals into the memory elements 411, 422 ... of the display memory scanned by the second sweep 41, when the sweep 41 is drawn. In this case, signals having previously been stored in the memory elements 411, 412 ... are erased. Thus, a sweep line marker (a line marker irrespective of received echo signals) can be indicated on the display surface of an indicator.

Figure 1:
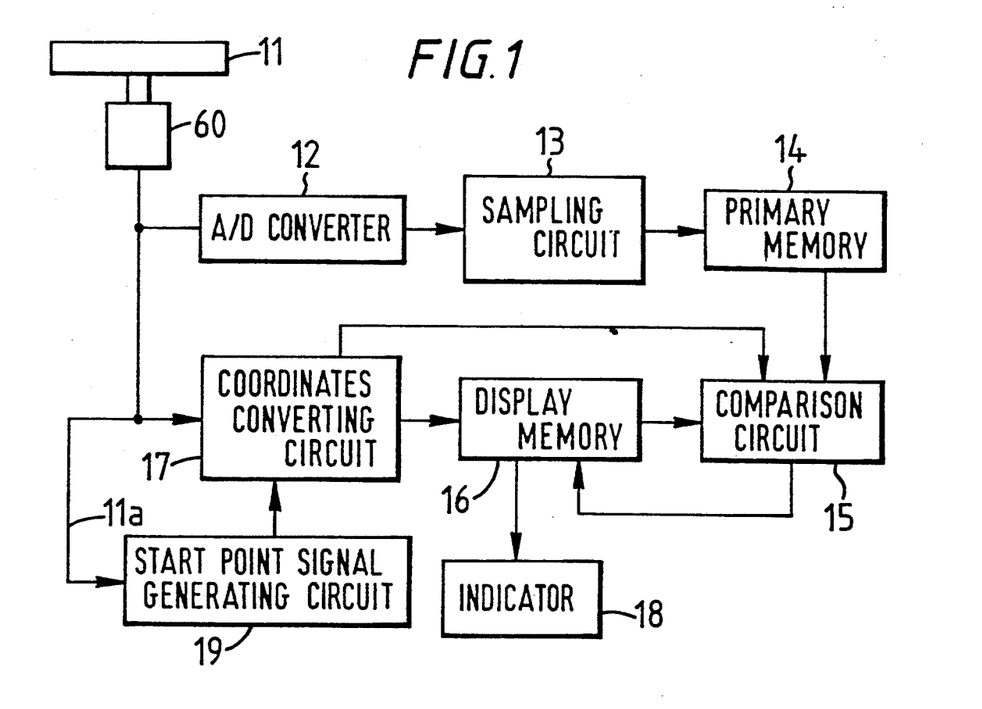
FIG. 1 shows a block diagram of an embodiment according to the present invention.

Referring to FIG. 1, a radar antenna 11 rotating at a speed radiates radar search signals successively in different directions, receives echo signals based on the respective search signals and supplies the echo signals to an A/D converter 12. The A/D converter 12 converts input analog signals to digital signals and supplies the resultant converted signals to a sampling circuit 13. A primary memory 14 has a memory capacity to store all the echo signals based on one rotation of a radar search signal and stores therein digital signals obtained with sampling signals by the sampling circuit 13. A transmitting and receiving unit 60 supplies signals 11a representative of the pointing direction of an antenna 11 to one input terminal of a coordinates converting circuit 17 and to a start point signal generating circuit 19. The coordinates converting circuit 17 converts polar coordinates to Cartesian coordinates and supplies a display memory 16 with signals representative of the addresses of respective memory elements of the display memory 16. The coordinates converting circuit 17 supplies the display memory with signals representative of addresses of the respective memory elements scanned by the second sweep, when the second sweep is traced in the display memory. The coordinates converting circuit 17 also supplies the display memory with address signals for identifying memory elements swept by the first sweep, when the first sweep is traced in the display memory. The start point signal generating circuit 19 supplies the coordinates converting circuit 17 with signals for displacing the start point of the second sweep by one dot with respect to the start point of the first sweep. The coordinates converting circuit 17 applies signals for distinguishing sweeps at one input terminal of a comparison circuit 15. The comparison circuit 15 writes signals of predetermined kinds into the display memory based on sweep distinguishing signals for distinguishing the first sweep or the second sweep supplied from the coordinates converting circuits 17. When the second sweep is traced in the display memory, signals supplied from the primary memory 14 are written into the memory elements scanned by the second sweep. When the first sweep is drawn, comparisons are made between signals read from the memory elements scanned by the first sweep and signals supplied from the primary memory and signals having the larger values of signals from the memory elements and signals from the primary memory are written into the same memory elements. An indicator 18 comprises a cathode-ray tube with all the picture elements thereof defined in Cartesian coordinates system and corresponding to memory elements of the display memory respectively and indicates surroundings of the radar apparatus on its display surface based on signals read out of the display memory 16.

Next, operation of the embodiment according to the present invention shown in FIG. 1 will be explained. Echo signals caught by the antenna 11 resulting from each radar search signal are transmitted to the A/D converter 12 to be converted to digital signals. The resultant digital signals are sampled by the sampling circuit 13 and then stored in the primary memory 14. While, the coordinates converting circuit 17 converts polar coordinates to Cartesian coordinates based on signals representative of bearing of the antenna supplied from the transmitting and receiving unit 60 and supplies the display memory 16 with address signals for identifying memory elements in the display memory scanned by the first sweep and the second sweep. In parallel with the generation of the address signals by the coordinates converting circuit 17, signals stored in the primary memory 14 are supplied to the comparison circuit 15 therefrom. Signals read from the memory elements of the display memory 16 scanned by the first sweep and the second sweep (i.e., memory elements into which signals are newly written into) are supplied to the comparison circuit 15. When the second sweep is drawn in the display memory, signals are supplied from the primary memory 14 through the comparison circuit 15 to the display memory and are written into the memory elements scanned by the sweep and identified by address signals supplied from the coordinates converting circuit 17. When the first sweep is traced in the display memory, signal comparisons are made in the comparison circuit 15 between signals supplied from the primary memory 14 and signals read from memory elements into which signals will be newly written, and signals having the larger values of these two kinds of signals are written into memory elements scanned by the sweep and identified by their addresses.

Figure 3:
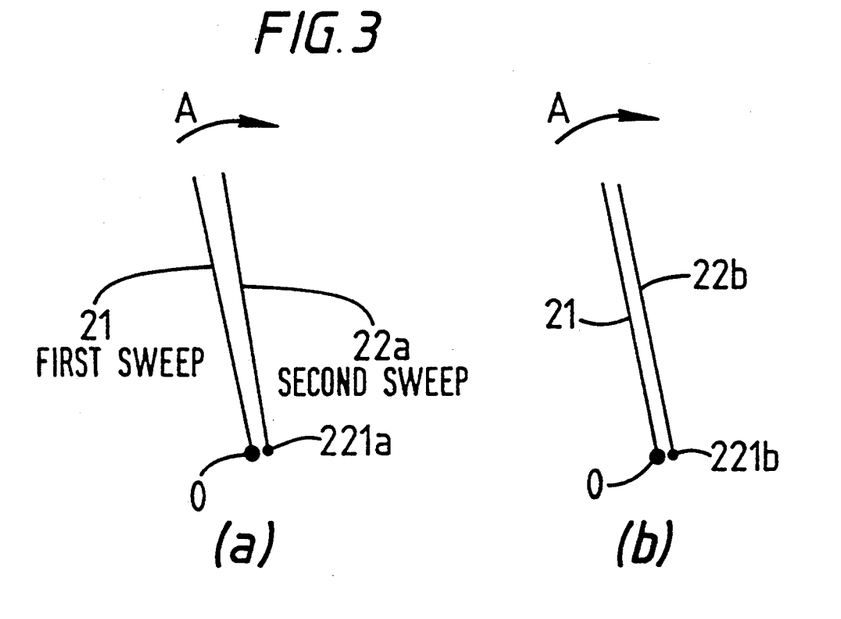
FIG. 3 shows a relationship between two independent sweeps scanning memory elements in a display memory used in a embodiment according to the present invention.
Figure 4:
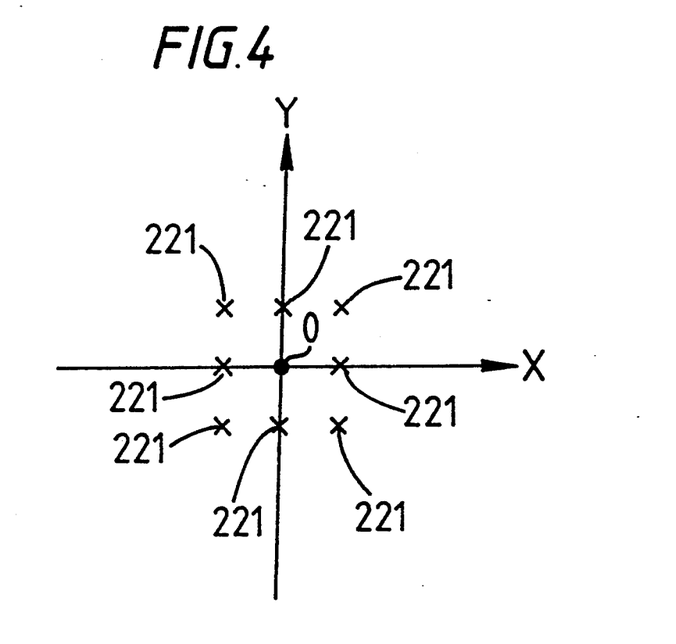
FIG. 4 shows a diagram for explaining a relationship between the start point of the first sweep and start points of the second sweep.

Next, there is explained interrelationships between two independent sweeps traced in the display memory used in the embodiment shown in FIG. 1. Referring to FIG. 3(b), the start point of the first sweep 21 is at the center, and the second sweep 22b is in parallel with the first sweep. The start point "0" of the first sweep 21 and the start point 221b of the second sweep 22b are spaced from each other by a distance equivalent to the width of one memory element of the display memory. In Cartesian coordinates, the start point 221b of the second sweep 22b with respect to the start point "0" of the first sweep 21 can be at eight positions 221 of picture elements in the neighborhood of the center "0" as shown in FIG. 4.

Figure 5:
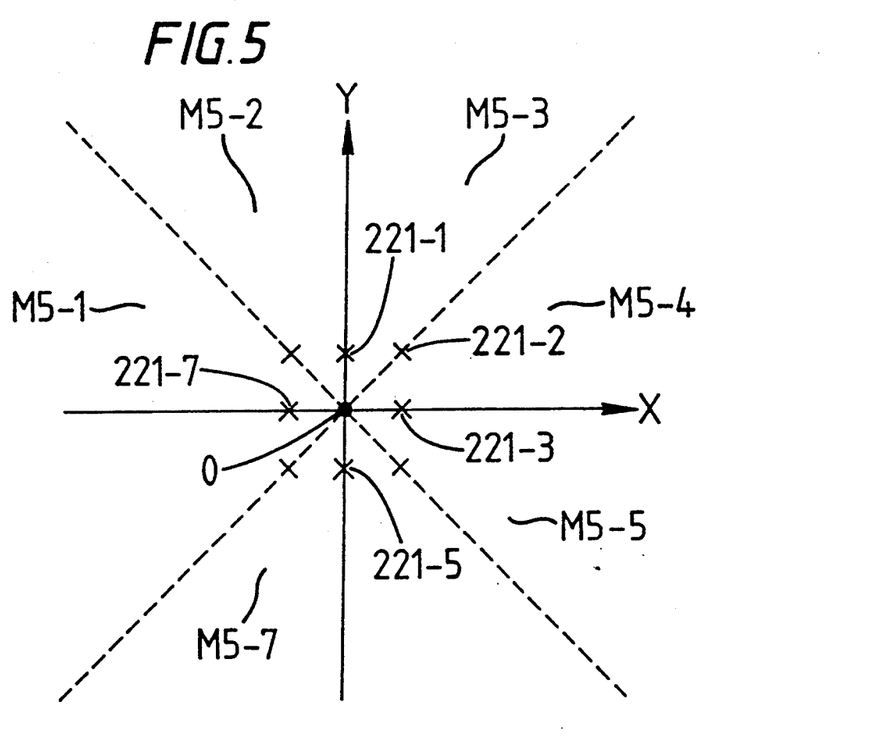
FIG. 5 shows a diagram for explaining a relationship between eight angular ranges obtained by dividing into eight the whole angular range in which the pointing bearing of the radar antenna moves and start points of the second sweep.

Referring to FIG. 5, while the pointing direction of the antenna is in an angular range designated as "M5-1", the position of a picture element, i.e., a memory element 221-1 will be the start point 221b of the second sweep 22b; while it is in an angular range designated as "M5-2", the position of a picture element 221-2 will be the start point 221b of the second sweep 22b; and while it is in an angular range designated as "M5-3", the position of a picture element 221-3 will be the start point 221b of the second sweep 22b. The same relationship holds true in the other angular ranges.

Figure 2:
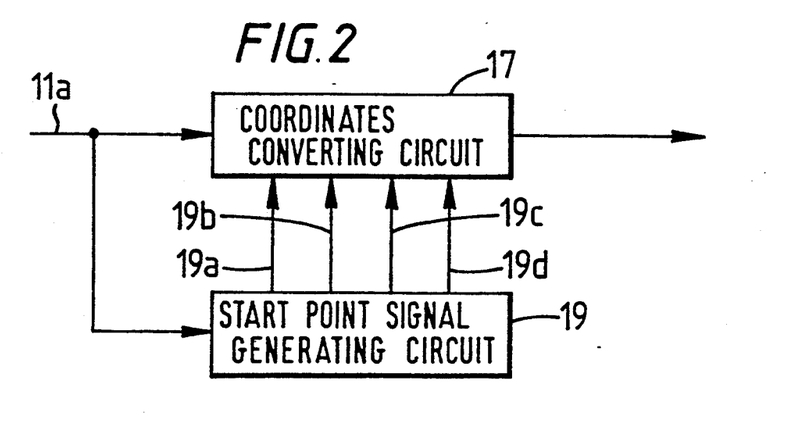
FIG. 2 shows a block diagram of a portion of the embodiment shown in FIG. 1.

FIG. 2 shows a block diagram of an embodiment of the coordinates converting circuit 17 and the start point signal qenerating circuit 19 used in the embodiment according to the present invention shown in FIG. 1, with these circuits producing signals representative of the start point "0" of the first sweep 21 and the start point 221b of the second sweep 22b.

Referring to FIG. 2, the coordinates converting circuit 17 is supplied through signal lines 19a to 19d with signals for producing address signals representative of the start point "0" of the first sweep 21 and the start point 221b of the second sweep 22b. The coordinates converting circuit 17 selects one of the memory elements 221-1, 221-2, 221-3, etc., as the coordinates of the start point 221b which is spaced by one dot with respect to the start point "0" of the first sweep 21 depending on levels of the signals supplied through the four signal lines 19a through 19d, when the second sweep 22b is run. One of the memory elements 221-1, 221-2, 221-3, etc., is selected as the converted coordinates of the start point 221b based on the signal 11a representative of the bearing of the antenna 11. The coordinates converting circuit 17 performs coordinates conversion without utilizing signals supplied from the start point signal generating circuit 19, i.e., not based on the signals so that the start point will be the center "0", when the first sweep 21 is drawn. When the second sweep 22b is traced, signals supplied through the four signal lines 19a through 19d are utilized so that the start point will be at one of the points 221-1, 221-2, 221-3, etc., which are spaced by one dot with respect to the center "0".

When the first imaginary sweep is traced, prior to writing signals into memory elements of the display memory 16, signals having been stored in memory elements are read therefrom and compared with signals supplied from the primary memory 14. The coordinates converting circuit 17 is made to produce address signals to perform a writing operation in the display memory. The display memory is supplied with instruction signals for performing a reading operation therein. Data signals read out of the display memory 16 are stored in the comparison circuit 15 and compared with data signals supplied from the primary memory 14.

The sweep distinguishing signal supplied to the comparison circuit 15 from the coordinates converting circuit 17 is at an "L" level when the second sweep is traced, and is at a "H" level when the first sweep is drawn. When the sweep distinguishing signal is at a "H"

level, data signals read from the memory elements of the display memory 16 scanned by the first sweep (the data signals which have been previously stored in the memory elements into which signals will be newly written) are compared with data signals supplied from the primary memory 14. Data signals having the larger values of the signals from the display memory and the signals from the primary memory are supplied to the display memory 16 and written into the memory elements. While, when the sweep distinguishing signal is at an "L" level, the second sweep 22b is traced and data signals read out of the primary memory 14 are written into the memory elements of the display memory 16 scanned by the sweep 22b.

In this way, a radar apparatus according to the present invention radiates a radar search signal and receives echo signals by the antenna, stores the echo signals in the primary memory 14, reads the signals two times therefrom each time the pointing direction of the antenna is varied, and writes two times the signals into the display memory 16. While, a conventional radar apparatus radiates a radar search signal and receives echo signals by an antenna, stores the echos signals in the primary memory, reads the signals on time therefrom and writes one time the signals into the display memory each time the pointing direction of the antenna is changed.

When the second imaginary sweep is traced, zero signals can also be written into respective memory elements of the display memory scanned by the sweep 41 so that a straight sweep line marker of narrow width can be displayed on the display surface of an indicator. This marker rotates about the start point thereof in synchronism with rotation of the antenna in an angular direction.

Figure 9:
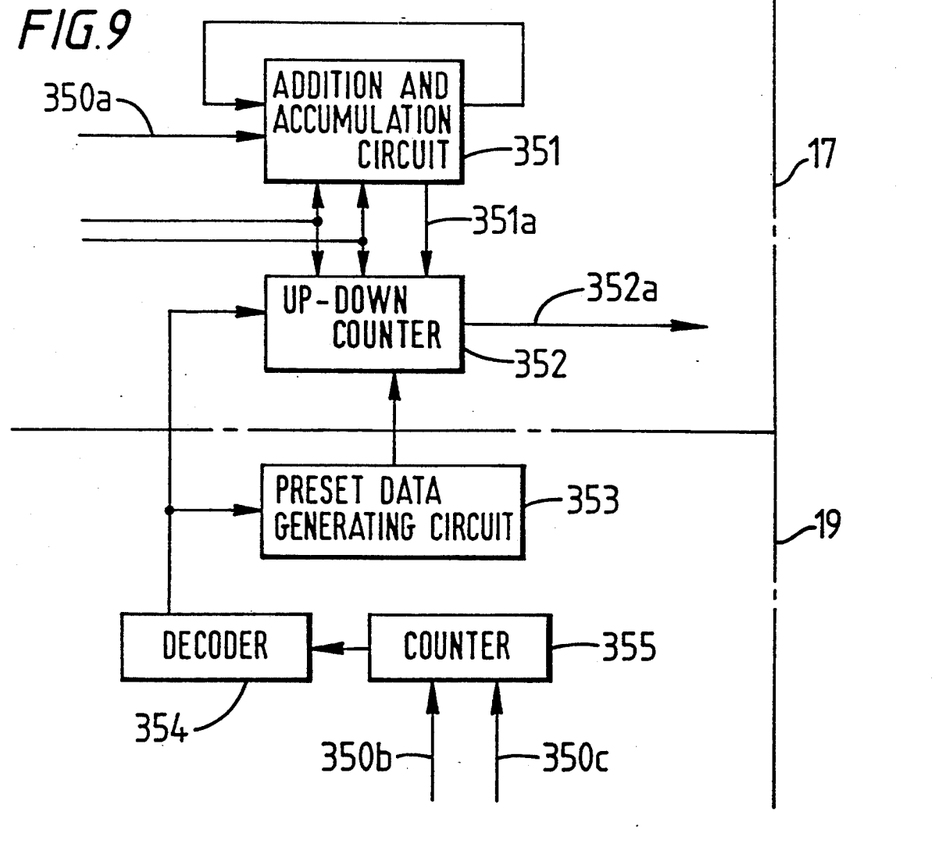
FIG. 9 shows a detailed block diagram of an embodiment of a coordinates converting circuit and a start point signal generating circuit used in a radar apparatus according to the present invention.

FIG. 9 shows a detailed block diagram of an X-coordinate generating unit in the coordinates converting circuit 17 and the start point signal generating circuit 19 (the electric circuit configuration of a Y-coordinate generating unit is the same as that of the X-unit).

An addition and accumulation circuit 351 and an up-down counter 352 form the coordinates converting circuit 17; and preset data generating circuit 353, a decoder 354 and counter 355 form the start point signal generating circuit 19.

The addition and accumulation circuit 351 is supplied with output signals 350a of a sine function generating circuit (not shown) at one input terminal thereof and with output signals of the addition and accumulation circuit 351 at another input terminal thereof. An overflow signal 351a representing that an accumulated value exceeds one is supplied to the up-down counter 352. The up-down counter 352 and the addition and accumulation circuit 351 are supplied with clock signals and reset signals. A counter 355 is supplied with angle clock signals 350b and a heading signal 350c. Output signals of the counter 355 are supplied to a decoder 354. Output signals of the decoder 354 representative of the quadrant of a searched area are supplied to the up-down counter 352 and the preset data generating circuit 353. Output signals of the preset data generating circuit 353 are supplied to the up-down counter 352.

Operation of the circuit block diagram as shown in FIG. 9 will be explained hereinafter.

The addition and accumulation circuit 351 adds the value of an output signal 350a of the sine function generating circuit to a previous value in response to a clock signal corresponding to a detection range from the start point of the sweep, and transmits an overflow signal 351a to the up-down counter 352 when a resultant added value exceeds one. At an instant of start of the coordinates conversion, the value of the internal adder of the addition and accumulation circuit is reset to zero by a reset signal. The up-down counter 352 performs an up count or a down count each time an overflow signal 351a is produced and transmits the resultant count value representative of an X-coordinate to the display memory 36 through the output line 352a. An up-count operation or a down-count operation is performed in accordance with a signal representative of the quadrant of a search area supplied from the decoder 354. At an instant of start of the coordinates conversion, the up-down counter 352 writes thereinto an output signal of the preset data generating circuit 353 and starts its counting operation with the value written thereinto.

Output signals of the decoder 354 will represent a bearing range of the pointing direction of the antenna 11, since the output signals are obtained by decoding the output signals of the counter 355. The value of preset data generated by the preset data generating circuit 353 varies in accordance with output signals of the decoder 354 representative of ranges of pointing bearing of the antenna 11 as shown in FIG. 5.

As illustrated in FIG. 10, the second imaginary sweep 41 is firstly run, then the first imaginary sweep 42 is drawn from a start point which is spaced by one dot with respect to the start point of the first sweep. In order to always make the second sweep 41 be in parallel with the first sweep 42, the start point 411 of the second sweep 41 is changed depending on a quadrant represented by output signals of the decoder 354 and to which the pointing bearing of the antenna 11 belongs. As illustrated in FIG. 5, for example, if a quadrant to which the pointing bearing of the antenna 11 belong is a quadrant represented as "M5-1" in FIG. 5, it is controlled so that picture element 221-1 becomes the start point of the second sweep 41.

Figure 11:
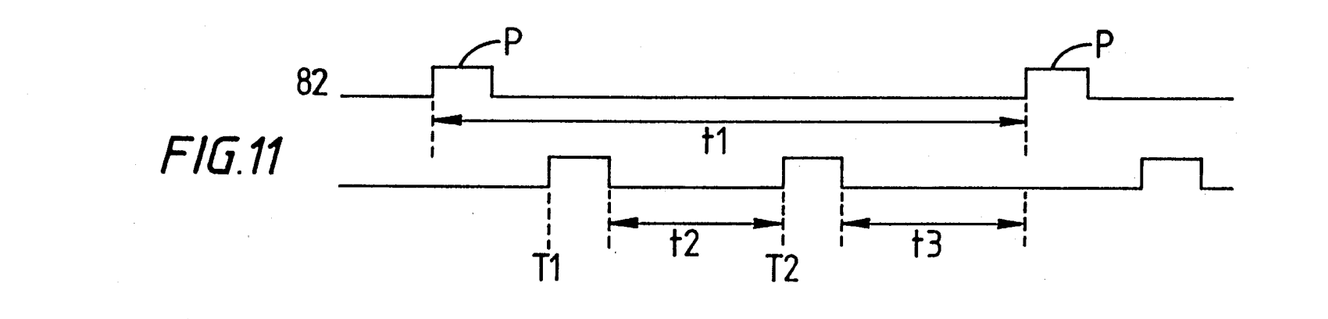
FIG. 11 shows a diagram for explaining operational timings of the first and second sweeps drawn in an embodiment according to the present invention.

The writing operational timings in association with the sweeps 41 and 42 is illustrated in FIG. 11. The writing operation is performed during a time period t1 of pulse "p" produced each time the pointing direction of the antenna 11 is varied. At a time instant "T1", in order to run the second sweep 41, the preset data generating circuit 353 transmits to the up-down counter 352 a value representative of a picture element 411 corresponding to the start point of the second sweep 41. During a time period "t2", coordinates conversion corresponding to the second sweep 41 is performed, and data signals from the comparison circuit 15 are written into the display memory 16. At a time instant "T2", the preset data generating circuit 353 transmits to the up-down counter 352 a value corresponding to the start point 421 of the first sweep 42. During a time period "t3", signals are written into respective memory elements scanned by the first sweep 42 in the display memory 16.

Figure 8:
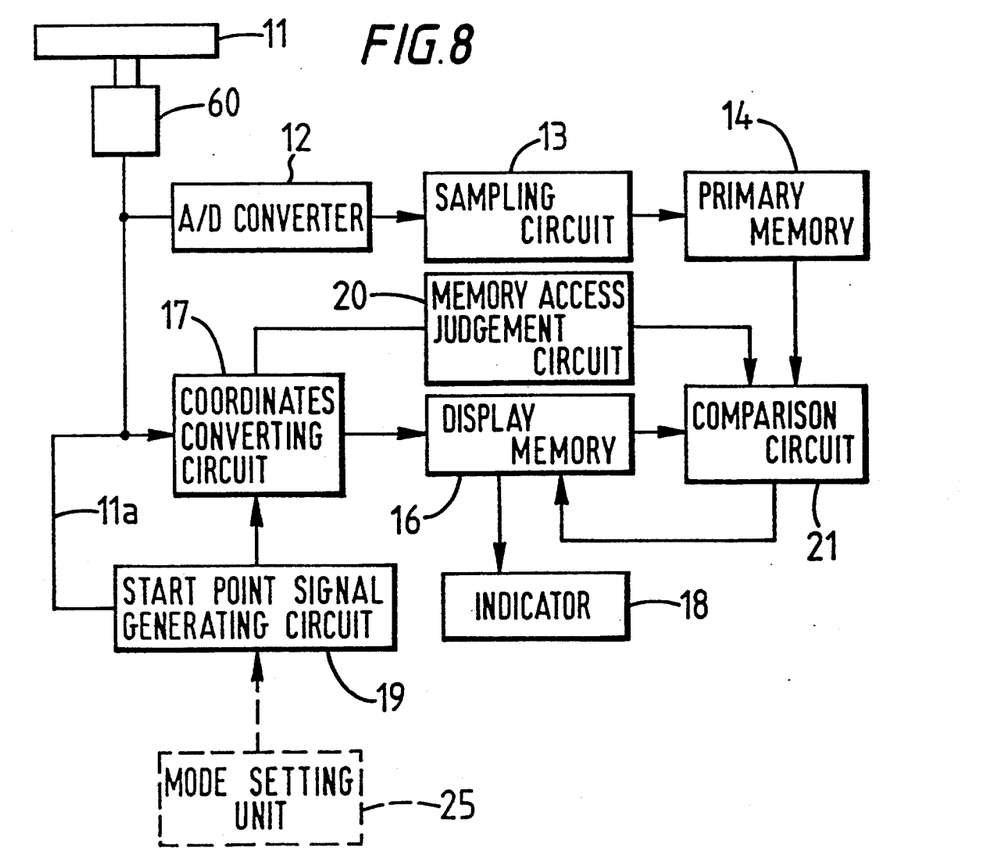
FIG. 8 shows a block diagram of another embodiment according to the present invention.

FIG. 8 shows a block diagram of another embodiment according to the present invention.

Differences between the block diagram shown in FIG. 8 and the block diagram shown in FIG. 1 are that a memory access judgement signal qenerating circuit 20 is further provided and a comparison circuit 21 performs operations different from those by the comparison circuit 15 shown in FIG. 1.

Referring to FIG. 8, the radar antenna 11 radiates radar search signals successively in different directions, receives echo signals based on the respective search signals and supplies the A/D converter 12 with the echo signals. The A/D converter 12 converts input analog signals to digital signals and supplies the sampling circuit 13 with the resultant converted signals. The primary memory 14 has a memory capacity to store echo signals corresponding to one sweep, with the echo signals produced based on one radar search signal, and stores therein digital signals sampled by the sampling circuit 13. The transmitting and receiving unit 60 supplies signals 11a representative of the pointing bearing of the antenna 11 to one input terminal of the coordinates converting circuit 17 and to the start point signal generating circuit 19. The coordinates converting circuit 17 and the start point signal generating circuit 19 are constructed as shown in FIG. 9. The coordinates converting circuit 17 converts polar coordinates to Cartesian coordinates, supplies the display memory 16 with signals representative of the addresses of memory elements of the display memory 16 and transmits a carry pulse (an overflow pulse or an underflow pulse) signal to the input terminal of the memory access judgement signal generating circuit 20. The memory access judgement signal generating circuit 20 produces different judgement signals depending on the sweep number of times of, for example, the second sweep 41 for scanning a memory element, for example, the memory element 412, with the second sweep 41 being of the two sweeps produced in the coordinates converting circuit 17 as shown in FIG. 10. For example, it transmits a judgement signal "1" (New) to the comparison circuit 21 if the second sweep 41 for scanning the memory element 412 is a first one, and transmits another judgement signal "Old" thereto if the second sweep 41 is a second one or a further one. The construction of the memory access judgement signal generating circuit 20 is described in the patent publication of an unexamined patent application No. 62-212586. The memory access judgement signal generating circuit 20 comprises a carry memorizing circuit 11, an up-down counter 12 and a same sweep address judgement circuit 14. The coordinates converting circuit 17 supplies the display memory with address signals for identifying memory elements thereof scanned by the first sweep when the first sweep is traced in the display memory. The coordinates converting circuit 17 also supplies the display memory with signals representative of addresses of the memory elements thereof scanned by the second sweep when the second sweep is traced in the display memory. The start point signal generating circuit 19 supplies the coordinates converting circuit 17 with signals for displacing the start point of the second sweep by one dot with respect to the start point of the first sweep. The comparison circuit 21 writes signals supplied from the primary memory into the memory elements scanned by the second sweep when the judgement signal "1" (New) is produced by the memory access judgement signal generating circuit 20, i.e., when the second sweep for scanning a memory element is a first one. While, the comparison circuit 21 compares signals read from the memory elements scanned by the second sweep and signals supplied from the primary memory and writes signals having the larger values of the signals supplied from the memory elements and the signals from the primary memory into the memory elements when the other judgement signal "Old" is produced by the memory access judgement signal generating circuit 20 i.e., when the second sweep 41 for scanning a memory element is a second one or a further one. When the first sweep 42 is run, the comparison circuit 21 compares signals read from the memory elements scanned by the first sweep with signals supplied from the primary memory and writes into the same memory elements signals having the larger values of the signals supplied from the memory elements and the signals supplied from the primary memory. The indicator 18 indicates conditions surrounding the radar apparatus based on signals read out of the display memory 16. The timings for scanning the first and second sweeps 42 and 41 are the same as those with the embodiment shown in FIG. 1 as illustrated in FIG. 11.

Next, operation of the embodiment according to the present invention shown in FIG. 8 will be explained hereinafter. Echo signals resulting from respective radar search signals and caught by the antenna 11 are converted by the A/D converter 12 to digital signals, sampled by the sampling circuit 13 and stored in the primary memory 14. While, the coordinates converting circuit 17 converts polar coordinates to Cartesian coordinates based on bearing signals supplied from the transmitting and receiving unit 60 and supplies the display memory 16 with address signals for identifying the memory elements of the display memory scanned by the first and second sweeps. In parallel with the production of address signals by the coordinates converting circuit 17, signals having previously been stored in the primary memory 14 are transmitted to the comparison circuit 21. There are supplied to the comparison circuit 21 signals read from the memory elements (into which signals are newly written) of the display memory 16 scanned by the first sweep and the second sweep. When the second sweep is traced in the display memory 16 and the judgement signal "1" (New) is produced by the memory access judgement signal generating circuit 20, signals having been stored in the primary memory are supplied to the display memory from the comparison circuit 21 These echo signals are written into respective memory elements of the display memory scanned by the second sweep. When the second sweep is traced in the display memory 16 and the other judgement signal is produced by the memory access judgement signal generating circuit 20, signals having the larger values of signals read out of the memory elements scanned by the second sweep and signals supplied from the primary memory. When the first sweep is traced after the second sweep, signals read from the memory elements of the display memory scanned by the first sweep are compared with signals supplied from the primary memory and signals having the larger values of the signals supplied from the display memory and the signals from the primary memory are written into the same memory elements. Thus, for example, if a memory element 412 shown in FIG. 10 is firstly scanned by the second sweep 41, signals supplied from the primary memory are written into the memory element. There is written into a memory element 422 scanned by the first sweep 42 and is contiguous to the memory element 412 a signal having the larger value of a signal read from the memory element 422 and a signal supplied from the primary memory so that an echo signal is expanded in an angular direction and written into the display memory. When the other judgement signal "Old" is produced from the memory access judgement signal generating circuit 20, signals read from the respective memory elements of the display memory scanned by the second sweep are compared by the comparison circuit 21 with signals supplied from the primary memory and signals having the larger values of the signals from the display memory and the signals from the primary memory are written into the same memory elements. Thus, if the second sweep 41 scanning the memory element 412 shown in FIG. 10 is a second one or a further one, signals having the larger values of the two kinds of signals from the two memories are written into the memory elements. There is written into a memory element 422 which is scanned by the first sweep 42 and is contiguous to the memory element 412 signals having the larger values of the signals read out of the memory element 422 and the signals supplied from the primary memory so that echo signals are expanded in an anqular direction and are written into the display memory. While the second sweep 41 and the first sweep 42 are rotated in a direction represented by an arrow "B" and scan other memory elements in the display memory, the same operation is performed. If echo signals are stored in the primary memory 14, the echo signals are expanded in an angular direction and are written into the display memory. Signals read from the display memory are indicated on the display surface of an indicator in a manner that echo signals caught by the antenna are expanded in an angular direction.

It should be noted that although, with the embodiment shown in FIG. 1, the first sweep and the second sweep drawn in the display memory are parallel with each other, it should not be limited to only this one. For example, another relationship therebetween as shown in FIG. 3(a) is also possible, in which the start point of the first sweep 21 is at the center and the start point of the second sweep 22a is not at the center and the first and second sweeps have different angles respectively with respect to a reference line.

Figure 6:
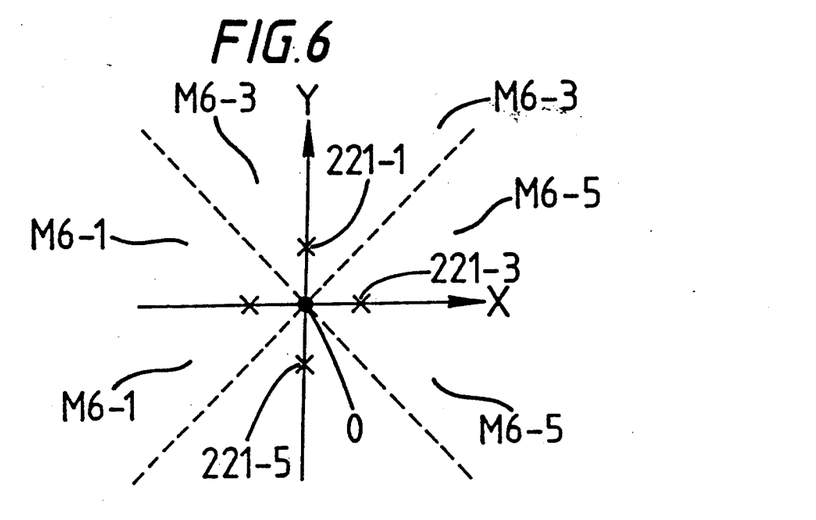
FIG. 6 and FIG. 7 show diagrams for explaining relationships between four angular ranges obtained by dividing into four the whole angular range in which the pointing direction of the radar antenna moves and start points of the second sweep.
Figure 7:
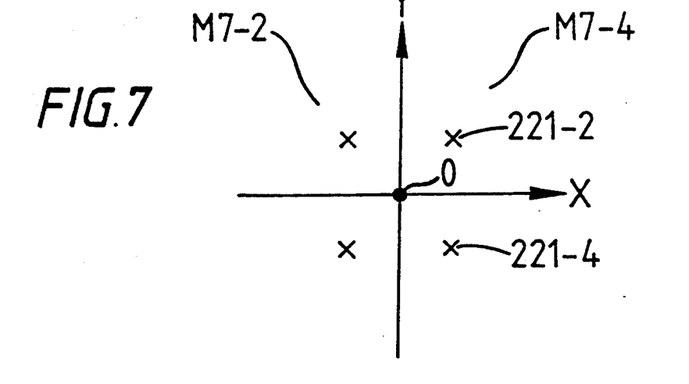

It should be noted that although the relationship between the start point of the first sweep and the start point of the second sweep in the display memory is as shown in FIG. 5 in the foregoing embodiment, it should not be limited to this one. It is also possible to divide the whole angular range into four parts, as shown in FIG. 6. If the pointing bearing of the antenna is in an angular range designated as "M6-1", the position of a picture element 221-1 is the start point of the second sweep; and if the pointing bearing of the antenna is within a range designated as "M6-3", the position of a picture element 221-3 is the start point of the second sweep. Another relationship as shown in FIG. 7 is also possible, in which if the pointing bearing of the antenna is in an angular range designated as "M7-2", the position of a picture element 221-2 is the start point of the second sweep; and if the pointing direction thereof is in a range designated as "M7-4", a picture element 221-4 will be the start point of the second sweep. It should be noted that the center "0" is the start point of the first sweep in FIG. 4, FIG. 5, FIG. 6 and FIG. 7.

Figure 12:
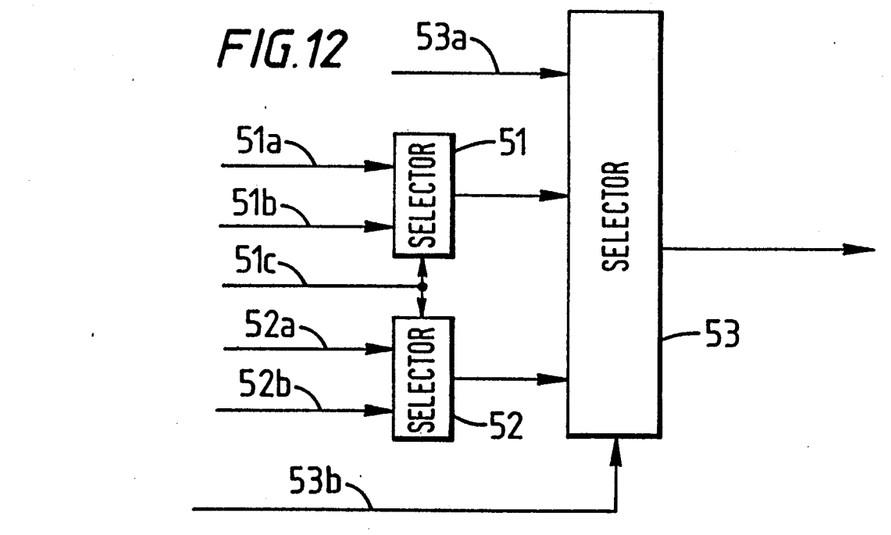
FIG. 12 shows a block diagram of an example of the start point signal generating circuit used in FIGS. 1, 8 or 15.

It should be noted that although, with the embodiment shown in FIG. 8, two sweeps are drawn in the display memory 16, it should not be limited to this one, and it is also possible to have three sweeps traced. Such increase of the number of the sweeps enables one to display echo signals in the vicinity of the own ship on the display surface of an indicator with the echo signals greatly extended in an angular direction and further enlarged. FIG. 12 shows the construction of the preset data generating circuit 353 (FIG. 9) used in this embodiment. A selector 51 is provided with signals 51a and 51b for displacing a sweep by one dot of picture element at the inputs thereof. The signals 51a and 51b displace the start point of the sweep in mutually opposite directions respectively. A selector 52 is provided with signals 52a and 52b for displacing a sweep by two dots of picture element at the inputs thereof. The signals 52a and 52b displace the start point of the sweep in mutually opposite directions. The selector 51 and the selector 52 are supplied with signals 51c representative of quadrants of search bearing. The selector 51 and the selector 52 are controlled in response to the signals 51c representative of quadrants of search bearing to select ones of the two signals applied thereto respectively and supply the selected ones to the input terminals of a selector 53. The selector 53 is also supplied with signals 53a which do not displace the start point of a sweep. The selector 53 is also supplied with control signals 53b at its control terminal. The selector 53 supplies in succession the up-down counter 352 of the coordinates converting circuit 17 in response to the control signals 53b with signals for not displacing the start point of a sweep, signals for displacing it by one dot and signals for displacing it by two dots. In this case, for example, the first sweep is traced starting with the center "0", the second sweep is drawn in parallel with the first sweep starting with a point which is spaced by one dot with respect to the center "0", and the third sweep is run in parallel with the first sweep starting with a point which is spaced by two dots with respect to the center "0". When echo signals are written into the display memory, firstly, signals supplied from the primary memory 14 are directly written into, or signals read out of the respective memory elements scanned by the third sweep are compared with signals supplied from the primary memory and signals having the larger values of the signals from the memory elements and the signals from the primary memory are written into the memory elements scanned by the third sweep, depending on a judgement signal produced by the memory access judgement signal generating circuit 20. Then, comparisons are made between signals read from the respective memory elements scanned by the second sweep and the signals supplied from the primary memory and signals having the larger values of the signals from the memory elements and the signals from the primary memory are written into the memory elements scanned by the second sweep. Then, comparisons are made between signals read from the respective memory elements of the display memory scanned by the first sweep and the signals supplied from the primary memory, and signals having the larger values of the signals from the display memory and the signals from the primary memory are written into the memory elements scanned by the first sweep. It is to be noted that with the embodiment according to the present invention shown in FIG. 8 and FIG. 9, the imaginary first and second sweeps are always drawn in the display memory and received echo signals are displayed as expanded in a angular direction. As another embodiment, a mode setting unit is provided and there is selected by the mode setting unit one of "Mode-1" and "Mode-2", with the Mode-1 for scanning memory elements by two imaginary sweeps of the display memory and storing echo signals therein as expanded in an angular direction and with the Mode-2 for scanning memory elements by one sweep of the display memory and storing echo signals therein without stretching the signals in an angular direction. When the Mode-1 is selected, the operation is the same as that of the embodiment shown in FIG. 8, as explained in the foregoing. When the Mode-2 is selected, each time the pointing direction of the antenna is varied, signals are supplied to the up-down counter 352 from the preset data generating circuit 353, shown in FIG. 9, for always placing the start point of the sweep at the center "0", thereby setting the value of the up-down counter to be zero. As a result, received echo signals are displayed without being expanded in an angular direction.

It should be noted that with the embodiment shown in FIG. 8, the length of the first sweep always corresponds to the search range selected, and all the incoming signals are extended in an angular direction and the echo signals are displayed as enlarged. As another embodiment, the length of the sweep is made to correspond to a short distance range from the own ship o the display surface of an indicator and thus only the echo signals indicated in the vicinity of the own ship on the display surface of the indicator are extended in an angular direction. Echo signals to be indicated at portions of the display surface at long distances away from the own ship are written into the memory elements scanned by one sweep in the display memory and are displayed on an indicator without being expanded in an angular direction.

It should be noted that with the embodiment shown in FIG. 8, the memory access judgement signal generating circuit 20 is provided, and two imaginary sweeps are drawn in the display memory 16 so that received echo signals are extended in an angular direction and displayed as expanded. It is also possible to extend received echo signals in an angular direction and display the signals as expanded without having the memory access judgement signal generating circuit This can be achieved by a radar apparatus having the construction thereof illustrated as the block diagram shown in FIG. 1. But, the coordinates converting circuit 17, the start point signal generating circuit 19 and the comparison circuit 15 operate in a different manner than explained in the foregoing. The coordinates converting circuit 17 scans memory elements with the first, second and third sweeps which are in parallel with each other and writes signals into memory elements scanned by the sweeps. The start point signal generating circuit 19 supplies the coordinates converting circuit 17 with signals for determining the start points of the first, second and third sweeps. The start point of the first sweep is at the center "0", the start points of the second and third sweeps are points spaced by one dot and two dots of picture element of the indicator respectively with respect to the center "0". The coordinates converting circuit 17 also transmits to the comparison circuit 15 distinguishing signals for distinguishing the first, second and third sweeps from one another. When the third sweep is run, zero signals from the comparison circuit 15 are written into memory elements of the display memory scanned by the sweep. When the second sweep is drawn, there are written into memory elements of the display memory scanned by the sweep signals having the larger values of signals read from the memory elements and signals supplied from the primary memory. Then, when the first sweep is traced, there are written into the memory elements of the display memory scanned by the sweep, signals having the larger values of the signals read from the memory elements and the signals supplied from the primary memory.

Figure 13:
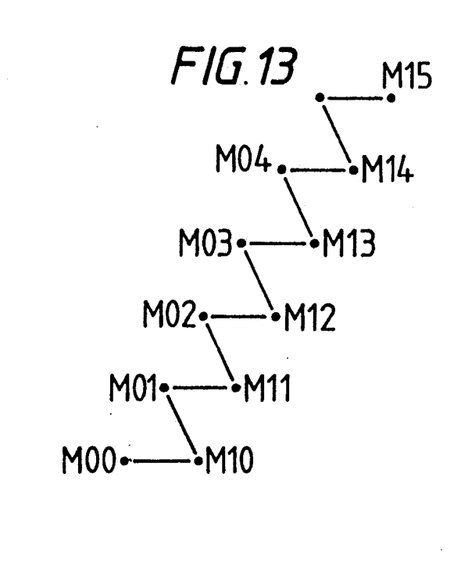
FIG. 13 shows a diagram for explaining a relationship between memory elements of a display memory and operational sequence of writing signals thereinto when echo signals are written into the display memory.

It should be noted that although in the foregoing embodiments, as shown in FIG. 10, the second sweep 41 is firstly drawn in the display memory to successively identify memory elements, and then the first sweep is traced to identify memory elements which are spaced by one dot of picture element with respect to the memory elements identified by the second sweep. The method for identifying memory elements of the display memory is not limited to this one. The same can be achieved by another method illustrated in FIG. 13. For example, memory elements can be identified in the order of M00, M10, M01, M11, M02, M12, M03, M13 . . . . . . , which results in the same as the memory elements identified by the two sweeps explained in the foregoing.

Figure 14:
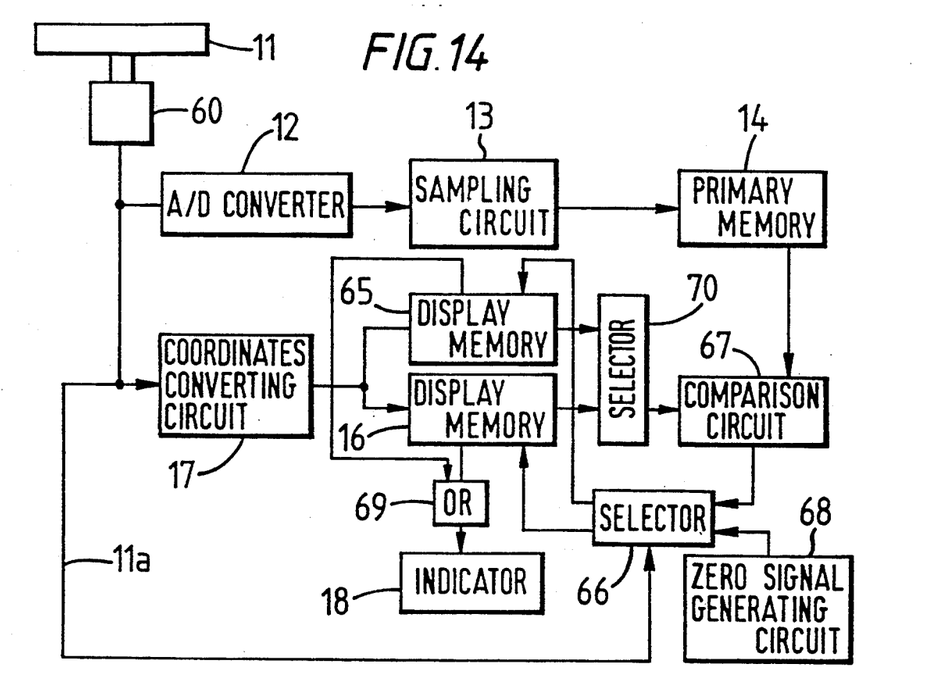
FIG. 14 shows a block diagram of another embodiment according to the present invention.

FIG. 14 shows another embodiment according to the present invention.

This embodiment of the present invention scans each of memory elements corresponding to areas in the vicinity of the antenna in the display memory with a plurality of sweeps during one rotation of the antenna and makes it possible to maintain storing in a memory element echo signals having been previously written even if zero signals are supplied to the display memory when the last sweep scans the memory element. One of the differences between the embodiment shown in FIG. 1 and this embodiment is that two display memories are provided and the start point signal generating circuit 19 becomes unnecessary.

The coordinates converting circuit 17 supplies the display memory 16 and the display memory 65 with the same address signals to identify memory elements in these display memories with the memory elements in one display memory corresponding to the memory elements in the other display memory. The display memory 16 and the display memory 65 draw respective sweeps therein each time the pointing direction of the antenna is varied to scan memory elements in the two display memories respectively with the memory elements in one display memory corresponding to the memory elements in the other display memory so that signals supplied from a selector 66 are written into the memory elements of the display memories respectively. The display memory 16 and the display memory 65 transmit signals stored therein to the input terminal of a comparison circuit 67 through a selector 70. The selector 70 supplies the comparison circuit 67 with signals alternately from the display memory 16 and the display memory 65 in response to bearing signals produced by the transmitting and receiving unit 60, for example, heading line signals. The comparison circuit 67 compares echo signals supplied from the primary memory 14 with signals read from the memory elements of the display memory 16 or the display memory 65 and supplies signals having the larger values of the signals from the primary memory and the signals from the display memories to one input terminal of the selector 66. A zero signal generating circuit 68 generates zero signals and supplies the signals to the other input terminal of the selector 66. The selector 66 supplies output signals of the comparison circuit 67 or zero signals supplied from the zero signal generating circuit 68 alternately in response to bearing signals from the transmitting and receiving unit 60 to one input terminals of the display memory 16 and the display memory 65. For example, during one rotation of the antenna 11, the selector 66 writes output signals of the comparison circuit 67 into the display memory 16 and zero signals supplied from the zero signal generating circuit 68 into the display memory 65. In this case, signals produced by the display memory 16 are supplied to the comparison circuit 67 through the selector 70. During one rotation of the antenna after a heading line signal is supplied to the selectors 66 and 70 from the radar transmitting and receiving unit 60, output signals of the comparison circuit 67 are written into the display memory 65, and zero signals produced by the zero signal generating circuit 68 are written into the display memory 16. In this case, signals produced by the display memory 65 are supplied to the comparison circuit 67 through the selector 70. Signals simultaneously read out of the display memory 16 and the display memory 65 are supplied to the indicator 18 through an OR circuit 69.

Figure 15:
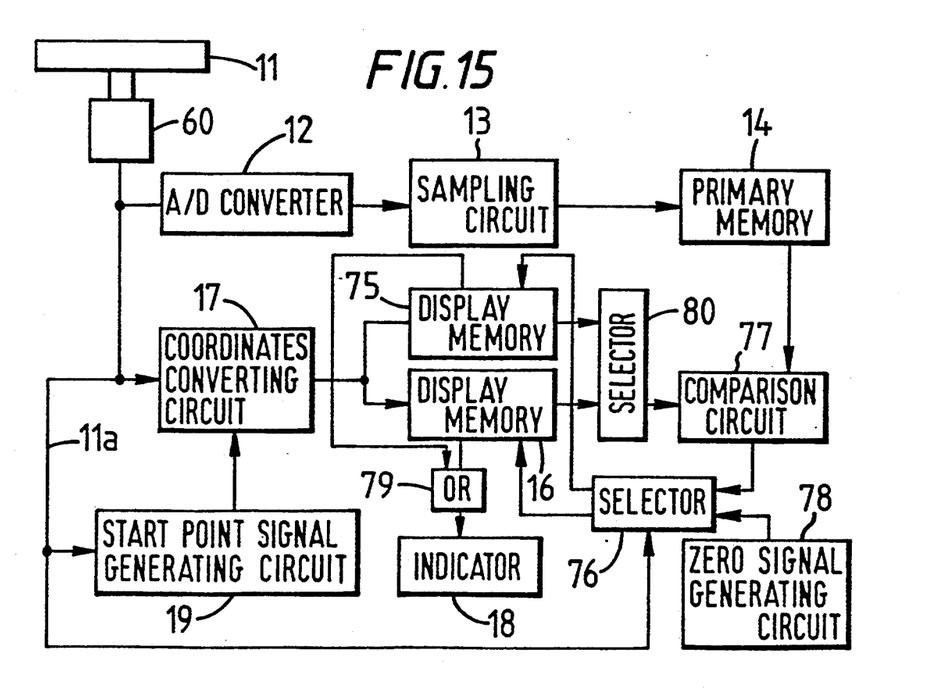
FIG. 15 shows a block diagram of another embodiment according to the present invention.

FIG. 15 shows another embodiment according to the present invention.

This embodiment of the present invention enables one to indicate echo signals received by the radar antenna as expanded in an angular direction, the same as the embodiment shown in FIG. 8. The difference between the embodiment shown in FIG. 8 and the one in FIG. 15 is that two display memories are provided and the memory access judgement signal generating circuit 20 becomes unnecessary. The coordinates converting circuit 17 supplies the display memory 16 and the display memory 75 with the same address signals to identify memory elements with the memory elements in one display memory corresponding to the memory elements in the other display memory. The display memory 16 and the display memory 75 draw two sweeps respectively each time the pointing bearing of the antenna is varied to scan memory elements corresponding to each other so that signals supplied from the selector 76 are written into the memory elements of the display memories. The display memory 16 and the display memory 75 transmit signals stored therein to the input terminal of the comparison circuit 77 through the selector 80. The selector 80 supplies the comparison circuit 77 with signals from the display memory 16 or the display memory 75 alternately in response to bearing signals produced by the radar transmitting and receiving unit 60, for example, heading line signals. The comparison circuit 77 compares signals supplied from the primary memory 14 with signals read from the memory elements of the display memory 16 or the display memory 75 scanned by the imaginary sweeps and supplies signals having the larger values of the signals from the primary memory and the signals from the display memories to one input terminal of the selector 76. A zero signal generating circuit 78 produces zero signals and supplies the signals to the other input terminal of the selector 76. The selector 76 supplies output signals of the comparison circuit 77 or zero signals produced by the zero signal generating circuit 78 to signal input terminals of the display memory 16 or the display memory 75 alternately in response to bearing signals, for example, heading line signals. For example, during one rotation of the antenna 11, the selector 76 writes output signals of the comparison circuit 77 into the display memory 16 and zero signals produced by the zero signal generating circuit 78 into the display memory 75. In this case, signals from the display memory 16 are transmitted to the comparison circuit 77 through the selector 80. Next, during one rotation of the antenna after a heading line signal is supplied to the selectors 76 and 80 from the radar transmitting and receiving unit 60, output signals of the comparison circuit 77 are written into the display memory 75, and zero signals produced by the zero signal generating circuit 78 are written into the display memory 16. In this case, signals produced by the display memory 75 are transmitted to the comparison circuit 77 through the selector 80. Signals simultaneously read from the display memory 16 and the display memory 75 are supplied to the indicator 18 through an OR circuit 79.

It should be noted that although the start point of the first sweep of the first, second and third sweeps drawn in the display memory is at the center in the foregoing embodiments, the start point of the second sweep can be placed at the center "0". It can be appropriately determined that the start point of one of the first, second and third sweeps is placed at the center "0", and another sweep or the other sweeps are positioned at the right side or the left side of the sweep.

It should be noted that the embodiments in the foregoing are only some embodiments in accordance with the present invention. It is apparent that a man skilled in the art can easily create other embodiments or modifications without departing the scope and the spirit of the present invention.

What is claimed is:

1. A raster scanning radar display apparatus for radiating radar search signals successively in different directions, storing in a display memory echo signals coming from respective directions, reading therefrom, and supplying signals to be displayed as conditions surrounding an antenna, comprising:
   a memory for storing echo signals based on one search signal;
   write address signal generating means for drawing a plurality of imaginary sweeps which do not intersect with each other in the display memory each time a pointing bearing or direction of the antenna is varied and for generating signals representative of addresses of memory elements in the display memory scanned by the sweeps;
   writing means for writing echo signals into the memory elements of the display memory scanned by one sweep and for writing predetermined signals into memory elements scanned by an other sweep or other sweeps;
   reading means for reading signals from the display memory; and
   an indicator for displaying the signals read from the display memory as conditions surrounding the antenna.

2. The raster scanning radar display apparatus as claimed in claim 1 wherein two sweeps are drawn.

3. The raster scanning radar display apparatus as claimed in claim 2 wherein the two sweeps are in parallel with each other.

4. The raster scanning radar display apparatus as claimed in claim 3 wherein echo signals are written into memory elements scanned by one sweep, and predetermined signals are written into memory elements scanned by another sweep.

5. The raster scanning radar display apparatus as claimed in claim 4 wherein zero signals are written into the memory elements scanned by the one sweep.

6. The raster scanning radar display apparatus as claimed in claim 4 wherein signals having larger values as between signals stored in the memory and signals read from the memory elements of the display memory scanned by the other sweep are written in the display memory.

7. The raster scanning radar display apparatus as claimed in claim 1 wherein three straight sweeps are drawn in the display memory which are parallel with each other.

8. The raster scanning radar display apparatus as claimed in claim 7 wherein zero signals are written into memory elements of the display memory scanned by the third sweep, and larger values of signals read from the memory elements of the display memory and echo signals supplied from the memory are written into memory elements of the display memory scanned by the second and first sweeps.

9. The raster scanning radar display apparatus as claimed in claim 1 wherein start points of respective sweeps are spaced from one another by one picture element.

10. A raster scanning radar display apparatus for radiating radar search signals successively in different directions by a rotating antenna, storing in a display memory echo signals coming from respective directions, reading therefrom, and supplying signals to be displayed as conditions surrounding the rotating antenna, comprising:

a memory for storing echo signals based on one search signal;

sweep scanning means for drawing a plurality of imaginary sweeps which do not intersect with each other in the display memory each time a pointing bearing of the rotating antenna is varied and for generating signals representative of addresses of memory elements in the display memory scanned by the sweeps;

judgement means for determining whether a present sweep for scanning memory elements of the display memory is a first sweep or a second sweep or a further sweep;

first writing means, in response to said judgement means, for writing echo signals supplied from said memory into memory elements of the display memory if a sweep for scanning the memory elements is a first sweep and for writing into memory elements of the display memory, scanned by a sweep, signals having larger values as between signals stored in said memory and the signals read from the memory elements of the display memory scanned by the sweep if the sweep is a second sweep or a further sweep;

second writing means for writing into the memory elements of the display memory scanned by a sweep other than said first sweep signals having larger values as between the signals stored in said memory and the signals read from the memory elements of the display memory scanned by the other sweeps;

reading means for reading signals from the display memory; and an indicator for displaying the signals read from the display memory.

11. The raster scanning radar display apparatus as claimed in claim 10 wherein two imaginary straight sweeps which are parallel with each other are drawn in the display memory.

12. The raster scanning radar display apparatus as claimed in claim 10 wherein three straight sweeps which are in parallel with each other are drawn in the display memory.

13. The raster scanning radar display apparatus as claimed in claim 10 wherein start points of the respective sweeps are spaced from one another by one picture elements.

14. A raster scanning radar display apparatus for rotating an antenna, radiating radar search signals successively in different directions by the antenna, storing in a display memory echo signals coming from respective directions, reading therefrom, and supplying signals to be displayed as conditions surrounding the antenna, comprising:

a memory for storing echo signals based on one search signal;

means for writing into memory elements of the display memory signals stored in said memory and signals generated based on the signals stored in said memory each time a pointing bearing or direction of the antenna is varied;

reading means for reading signals from the display memory; and an indicator for indicating the signals read from the display memory.

15. A raster scanning radar display apparatus for rotating an antenna, radiating radar search signals successively in different directions by the antenna, storing in a display memory echo signals coming from respective directions, reading therefrom, and supplying signals to be displayed as conditions surrounding the antenna, comprising:

a memory for storing echo signals based on one search signal;

erasing means for erasing all signals stored in the display memory;

address signal generating means for drawing one imaginary sweep or a plurality of imaginary sweeps which are in parallel with each other in the display memory each time a pointing bearing or direction of the antenna is varied and for generating signals representative of addresses of memory elements in the display memory scanned by the sweep or sweeps;

writing means for writing into the memory elements of the display memory scanned by said one imaginary sweep or said plurality of imaginary sweeps signals having larger values as between signals stored in said memory and signals read from the memory elements in the display memory scanned by the sweep or sweeps;

reading means for reading signals from the display memory; and an indicator for displaying the signals read from the display memory.

16. The raster scanning radar display apparatus as claimed in claim 15 wherein said plurality of imaginary sweeps are two sweeps.

17. A raster scanning radar display apparatus for rotating an antenna, radiating radar search signals successively in different directions by the antenna, storing echo signals coming from respective directions, reading therefrom, comprising:

a memory for storing echo signals based on one search signal;

a first and second display memory;

address signal generating means for drawing a plurality of imaginary sweeps which are parallel with each other in said first and second display memory each time a pointing bearing or direction of the antenna is varied and for generating signals representative of addresses of memory elements in said first and second display memory scanned by the sweeps;

zero signal generating means for generating zero signals;

bearings signal generating means for generating signals representative of the pointing bearing of the radar antenna;

writing means, in response to said bearing signal generating means, for writing alternately into the memory elements scanned by said plurality of sweeps in said first and second display memory, respectively, signals having larger values as between signals stored in said memory and signals read from the memory elements scanned by said plurality of sweeps and output signals of said zero signal generating means;

reading means for reading signals from said first and second memory; and an indicator for displaying the signals read from said first and second display memory.

18. A raster scanning radar display apparatus for rotating an antenna, radiating radar search signals successively in different directions by the antenna, storing echo signals coming from respective directions, reading therefrom, and supplying signals to be displayed as conditions surrounding the antenna, comprising:

a memory for storing echo signals based on one search signal;

a first and second display memory;

address signal generating means for drawing one imaginary sweep in said first and second display memory, respectively, each time a pointing bearing or direction of the antenna is varied and for generating signals representative of addresses of memory elements of said first and second display memory scanned by the sweeps;

zero signal generating means for generating zero signals;

bearing signal generating means for generating signals representative of the pointing bearing or direction of the radar antenna;

writing means, in response to said bearing signal generating means, for writing alternately into the memory elements scanned by said sweeps in said first and second display memory, respectively, signals having larger values as between signals stored in said memory and signals read from the memory elements scanned by said sweeps and output signals of said zero signal generating means;

reading means for reading signals from said first and second memory; and an indicator for displaying the signals read from said first and second display memory.

19. A method for displaying echo signals of radar search signals radiated successively in different directions on a raster scanned displayed surface, comprising the steps of:

(a) drawing a plurality of sweeps which do not intersect with each other when echo signals are written into a display memory;

(b) rotating these sweeps about start points of the sweeps in a direction;

(c) writing into memory elements of the display memory scanned by one sweep echo signals or signals generated based on the echo signals; and (d) writing predetermined signals into the memory elements of the display memory scanned by other sweeps.

20. A raster scanning radar display apparatus for rotating an antenna, radiating radar search signals successively in different directions by the antenna, storing in a display memory echo signals coming from respective directions, reading therefrom, and supplying signals to be displayed as conditions surrounding the antenna, comprising:

a memory for storing echo signals based on one search signal;

first sweep scanning means for drawing one sweep in the display memory each time a pointing bearing of the antenna is varied and for generating signals representative of addresses of memory elements of the display memory scanned by the sweep;

second sweep scanning means for drawing a plurality of sweeps which are in parallel with each other in the display memory each time the pointing bearing of the antenna is varied and for generating signals representative of memory elements of the display memory scanned by the sweeps;

selecting means for selecting either said first sweep scanning means or said second sweep scanning means;

judgement means for determining whether a sweep by said first sweep scanning means or a sweep by said second sweep scanning means is a first sweep or a second sweep or a further sweep;

first writing means, in response to said judgement means, for writing echo signals supplied from said memory, if the sweep by said first sweep scanning means or the sweep by said second sweep scanning means is a first sweep, into the memory elements of the display memory scanned by the sweep, and if the sweep by said first sweep scanning means or the sweep by said second sweep scanning means is a second sweep or a further sweep, writing into the memory elements scanned by the sweep signals having larger values as between signals stored in said memory and signals read from the memory elements scanned by the sweep;

second writing means for writing into the memory elements of the display memory scanned by other than said first sweep by said second sweep scanning means signals having larger values as between signals stored in said memory and signals read from the memory elements scanned by the other sweeps;

reading means for reading signals from the display memory; and an indicator for displaying the signals read from the display memory.

* * * * *